US006995639B2

(12) United States Patent
Minowa et al.

(10) Patent No.: US 6,995,639 B2
(45) Date of Patent: Feb. 7, 2006

(54) ELECTROMAGNETIC RELAY

(75) Inventors: Ryota Minowa, Yamaga (JP); Keisuke Yano, Kikuchi (JP); Kazuchika Hiroki, Kumamoto (JP); Yasuhiro Yokote, Kumamoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/118,785

(22) Filed: Apr. 29, 2005

(65) Prior Publication Data

US 2005/0242907 A1 Nov. 3, 2005

(30) Foreign Application Priority Data

Apr. 30, 2004 (JP) ............................ 2004-135897

(51) Int. Cl.
*H01M 51/22* (2006.01)

(52) U.S. Cl. .......................................... 335/83; 335/78

(58) Field of Classification Search ............ 335/78–86; 336/192

See application file for complete search history.

(56) References Cited

U.S. PATENT DOCUMENTS 6,731,190 B2 * 5/2004 Yamashita et al. ............ 335/78
6,750,744 B2 * 6/2004 Misumi et al. ............... 335/78
6,781,490 B2 * 8/2004 Funayama et al. ............ 335/78
6,861,932 B2 * 3/2005 Shinoura et al. .............. 335/78
2002/0109569 A1 8/2002 Yamashita et al.

FOREIGN PATENT DOCUMENTS

JP 2001-155610 6/2001

OTHER PUBLICATIONS

Patent Abstracts of Japan, Publication No. 2001-155610 dated Jun. 8, 2001, 1 page.
European Search Report for European Application No. EP 05 10 3318 mailed on Aug. 19, 2005, 3 pages.

* cited by examiner

*Primary Examiner*—Ramon M. Barrera
(74) *Attorney, Agent, or Firm*—Osha•Liang LLP

(57) ABSTRACT

An electromagnetic relay which is short in length and capable of maintaining a required insulation distance is disclosed. A first coil terminal connecting with one of extension lines of a coil is disposed in the vicinity of one end of a movable iron fragment and a card. A second coil terminal having a binding member which extends from an intermediate portion of the second coil terminal in a horizontal direction and is allowed to be bended toward the electromagnet block with the other of the extension lines of the coil bound to the binding member is further disposed below the electromagnet block.

1 Claim, 14 Drawing Sheets

FIG.8A
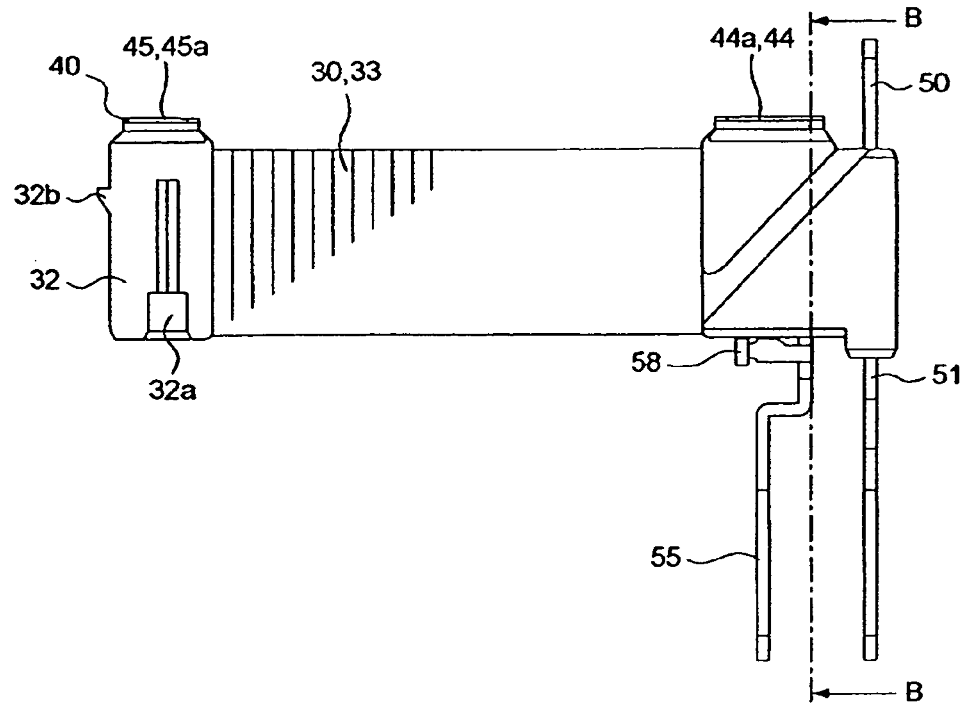
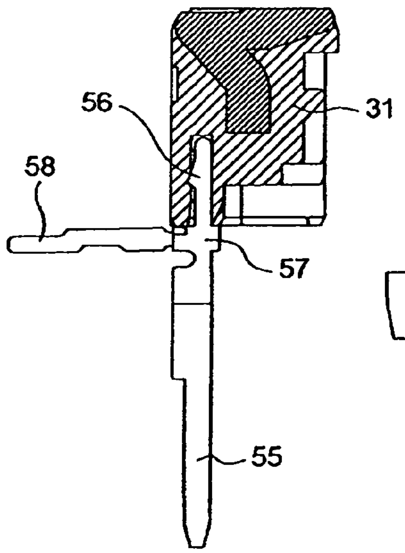
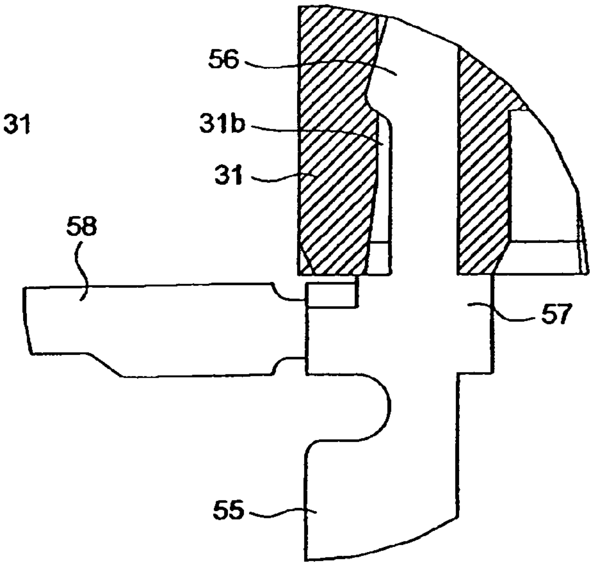
FIG.8B
FIG.8C

FIG.11A
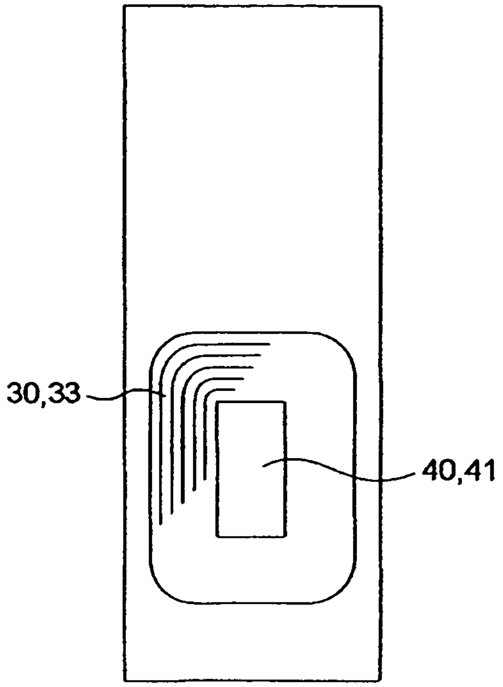
FIG.11B
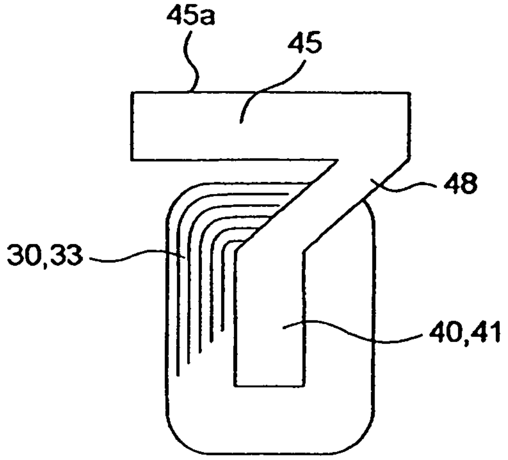
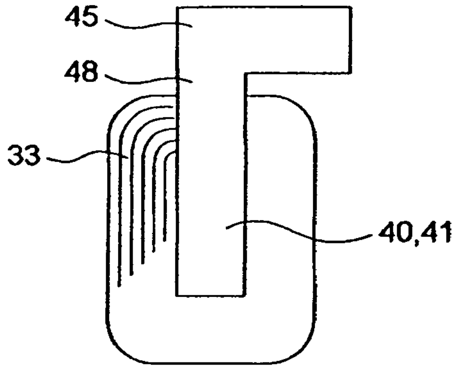
FIG.11C

ELECTROMAGNETIC RELAY

FIELD OF THE INVENTION

The present invention relates to an electromagnetic relay, and more particularly to disposition of coil terminals in an electromagnetic relay having a short length.

BACKGROUND ART

An example of a conventional electromagnetic relay is shown in FIGS. 14A and 14B. As illustrated in these figures, an electromagnet block 3 is formed by winding a coil 2 around a barrel of an iron core 1 which is substantially U-shaped as viewed from the front. One end 4*a* of a movable iron fragment 4 is rotatably supported by one magnetic pole 1*a* of the iron core 1, and the other end 4*b* of the movable iron fragment 4 is opposed to the other magnetic pole 1*b* of the iron core 1 such that the other end 4*b* can be attracted to the other magnetic pole 1*b* (see JP-A-2001-155610). A card 5 is vertically moved by an engaging claw 4*c* which extends from the other end 4*b* of the movable iron fragment 4 rotatable in accordance with energization and de-energization of the electromagnet block 3 to open and close a contact. In particular, in order to make the electromagnetic relay thinner two coil terminals 6 and 7 connected with an extension line of the coil 2 are disposed within the width of the movable iron fragment 4 without protrusion of the coil terminals 6 and 7 therefrom.

In the above electromagnetic relay, however, the upper end of the coil terminal 6 protrudes outward from the tip of the movable iron fragment 4 in the longitudinal direction so as to secure a predetermined insulation distance between the coil terminals 6 and 7 and a space required to bind the extension line of the coil 2 thereto. Therefore, there is a limitation to the reduction of the length of the above electromagnetic relay, and thus an electromagnetic relay having greatly decreased length cannot be manufactured.

SUMMARY OF THE INVENTION

One or more embodiments of the invention provide an electromagnetic relay which is short in length and capable of maintaining a required insulation distance.

In accordance with one or more embodiments, an electromagnetic relay according to the invention includes: an electromagnet block formed by winding a coil around a barrel of an iron core which is substantially U-shaped as viewed from the front; and a movable iron fragment, one end of which is rotatably supported by one of magnetic poles of the iron core, and the other end of which is opposed to the other of the magnetic poles of the iron core such that the other end of the movable iron fragment can be attracted to the other of the magnetic poles, so as to vertically move a card by the other end of the movable iron fragment rotatable in accordance with energization and de-energization of the electromagnet block and thus to open and close a contact. A first coil terminal connecting with one of extension lines of the coil is disposed in the vicinity of the other end of the movable iron fragment and the card. A second coil terminal having a binding member which extends from an intermediate portion of the second coil terminal in a horizontal direction and is allowed to be bended toward the electromagnet block with the other of the extension lines of the coil bound to the binding member is further disposed below the electromagnet block.

According to one or more embodiments of the electromagnetic relay of the invention, since the second coil terminal is disposed below the electromagnet block, a space for disposing two coil terminals side by side in the same plane as in the related-art electromagnetic relay is not needed. As one of the coil terminals does not protrude outward, the electromagnetic relay of the invention is shorter in length than the related-art electromagnetic relay. Moreover, by disposing the second coil terminal below the electromagnet block, a required insulation distance between the first and second coil terminals can be easily secured. Thus, the electromagnetic relay of the invention has high insulating characteristics.

BRIEF DESCRIPTION OF THE DRAWINGS

FIG. 8A is a front view of the electromagnet block shown in FIG. 4; FIG. 8B is a partial cross-sectional view of FIG. 8A; and FIG. 8C is an enlarged cross-sectional view of FIG. 8B.

FIGS. 11A and 11B are schematic cross-sectional views in the first embodiment; and FIG. 11C is a schematic cross-sectional view of a comparison example.

DESCRIPTION OF THE PREFERRED EMBODIMENTS

Figure 1:
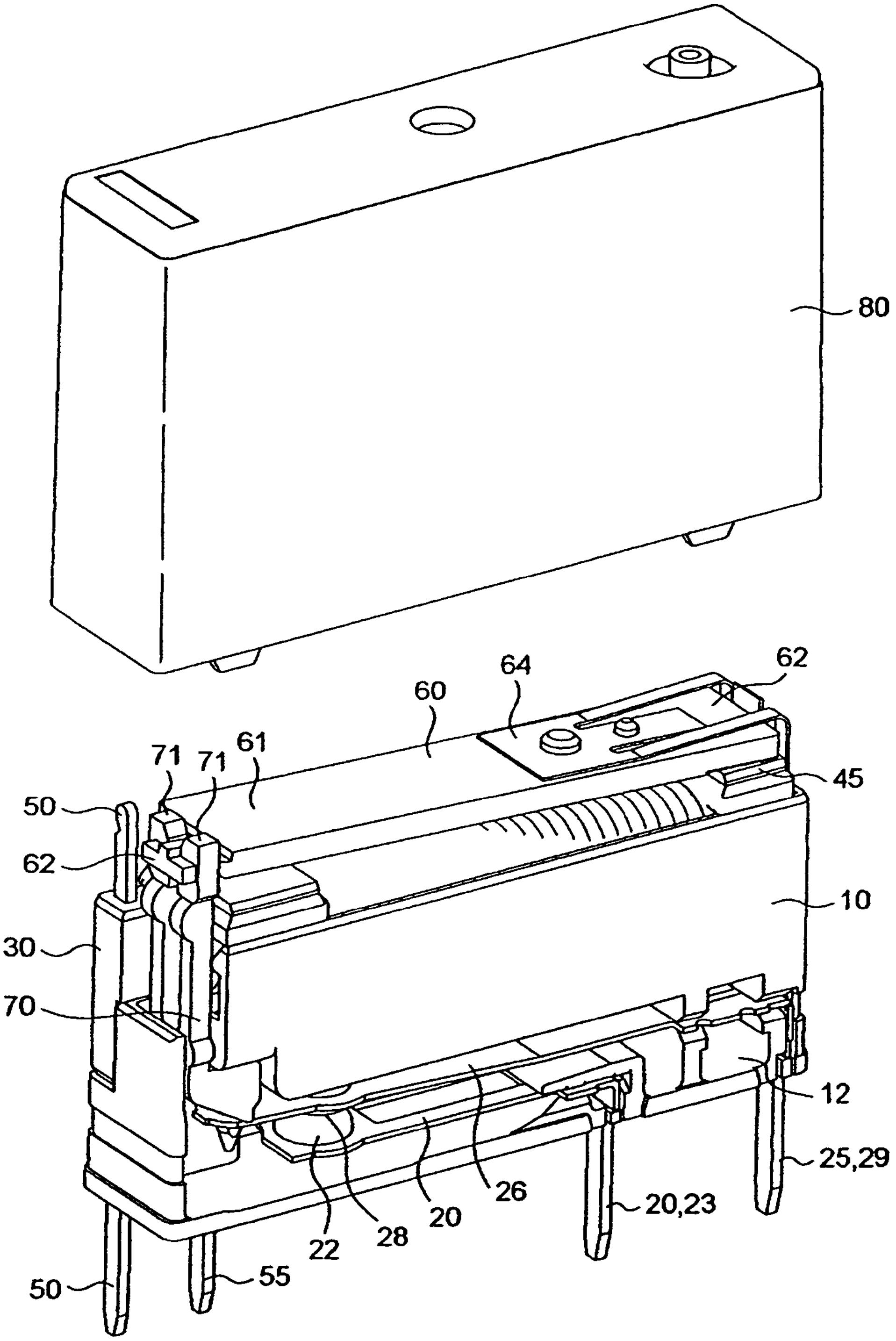
FIG. 1 is a perspective view of a disassembled electromagnetic relay in accordance with a first embodiment of the invention.

Preferred embodiments according to the invention are herein after described with reference to the appended drawings of FIGS. 1 through 13.

As illustrated in FIGS. 1 through 11, an electromagnetic relay in a first embodiment includes a base 10, a fixed contact terminal 20, a movable contact terminal 25, an electromagnet block 30, a movable iron fragment 60, a card 70, and a case 80. A housing of the electromagnetic relay in accordance with one embodiment of the invention is 5 mm in width, 12.5 mm in height and 20 mm in length.

Figure 3:
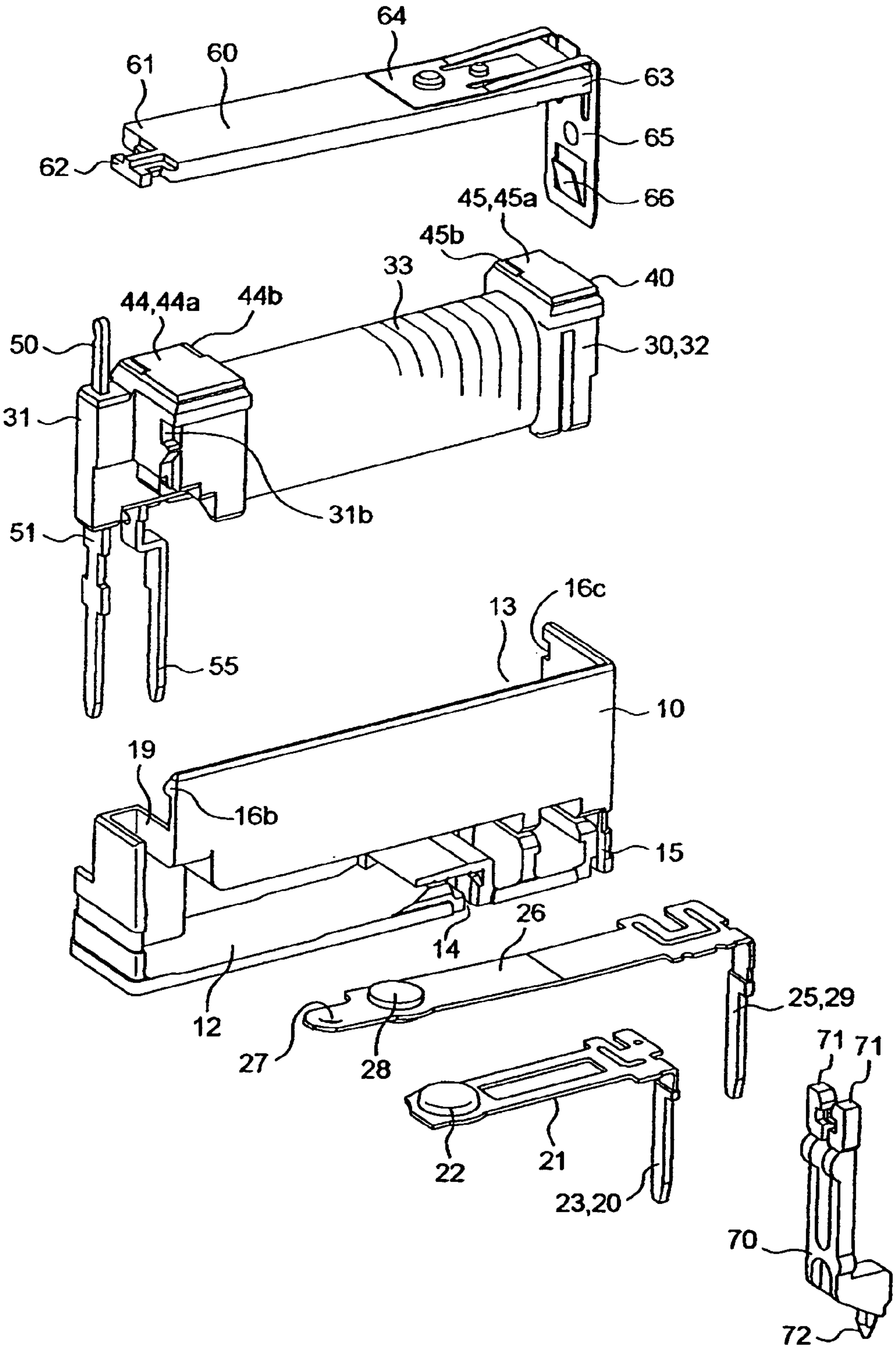
FIG. 3 is a perspective view of the details of the disassembled main part of the electromagnetic relay shown in FIG. 1.
Figure 4:
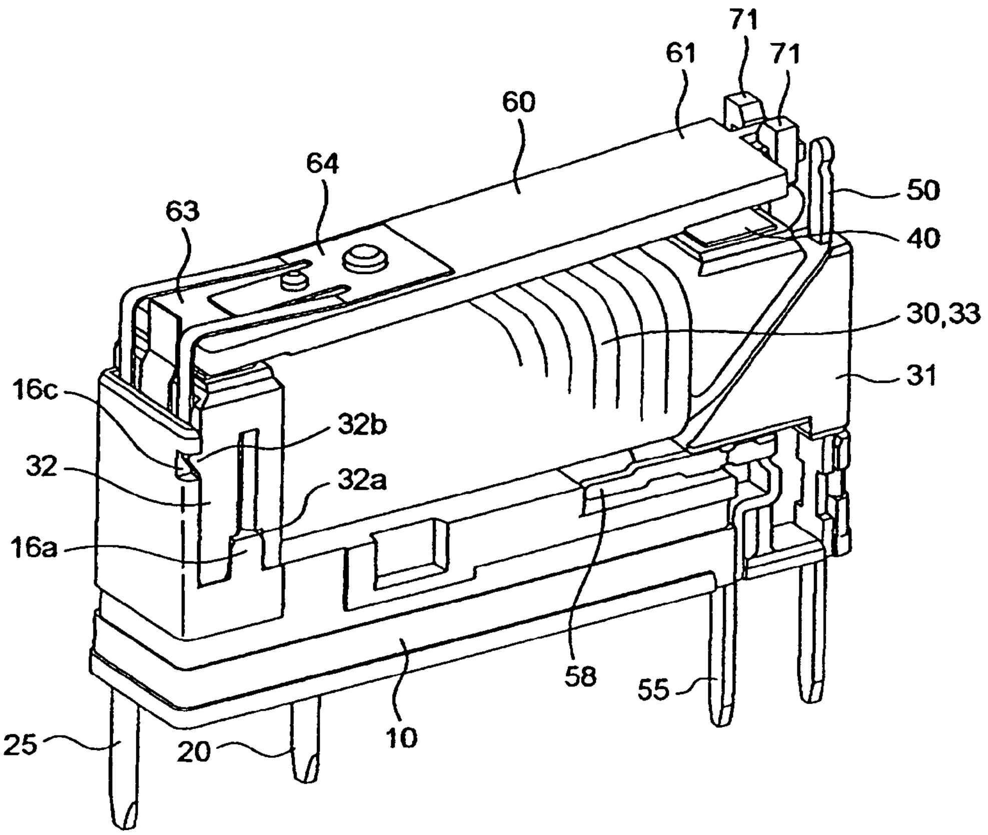
FIG. 4 is a perspective view of the main part of the electromagnetic relay shown in FIG. 1 as viewed at a different angle.

The base 10 has an insulating partition wall 11 (FIG. 7) which is formed integrally with the base 10. The insulating partition wall 11 has a substantially U-shaped cross section which opens to the side of an intermediate portion of the base 10, and provides a lower space 12 and an upper space 13 both of which open to the opposite sides. As illustrated in FIG. 3, press-fit grooves 14 and 15 to which the fixed contact terminal 20 and the movable contact terminal 25 to be described later can be press-fitted from the side, respectively, are provided within the lower space 12 along an assembly direction.

Figure 7:
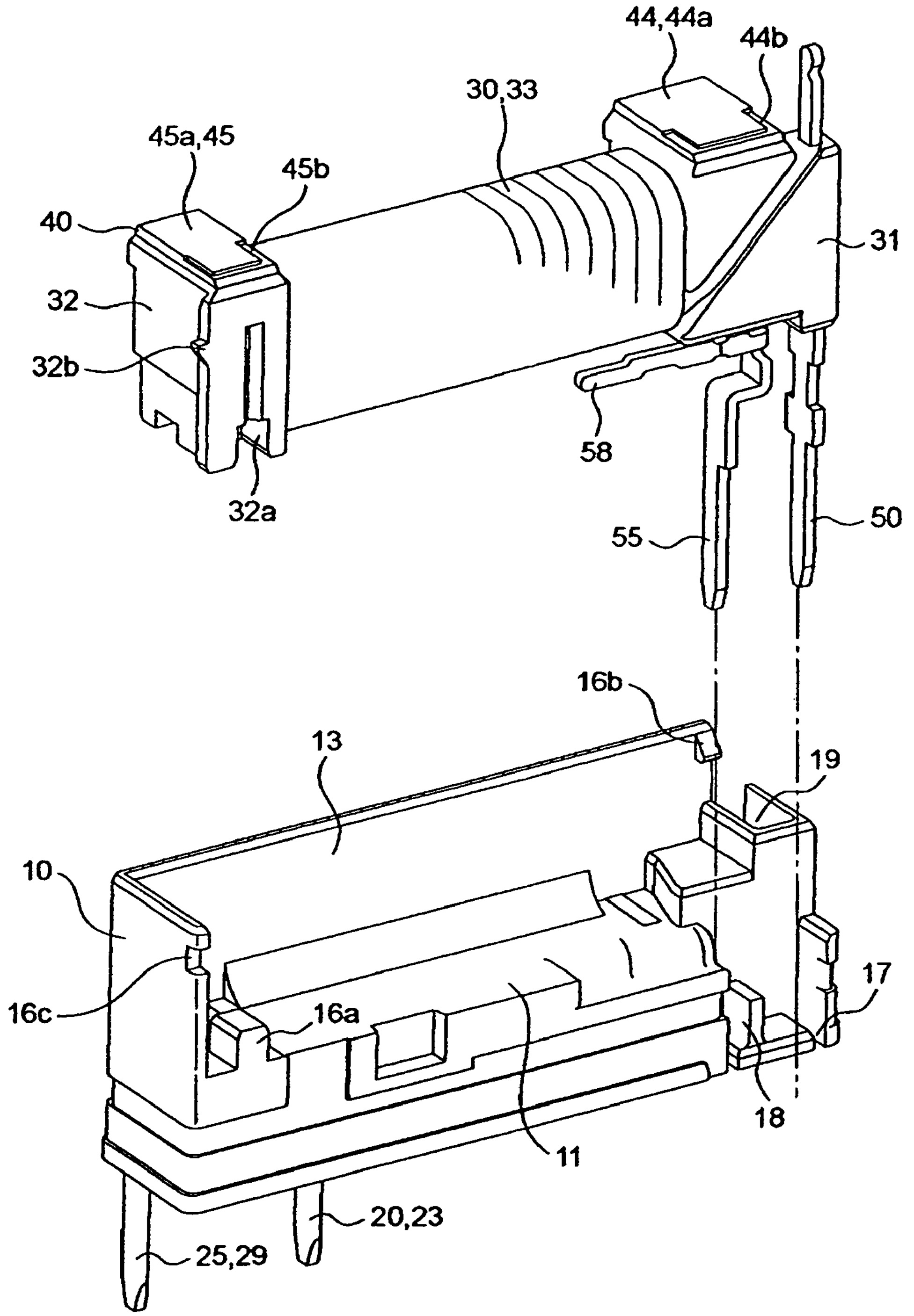
FIG. 7 is a perspective view of a disassembled electromagnet block shown in FIG. 4.

As illustrated in FIG. 7, provided within the upper space 13 of the base 10 is a positioning projection 16*a* engaging with a notch 32*a* formed on a brim 32 of the electromagnet block 30 to be described later so as to position the electromagnet block 30 when the electromagnet block 30 is lowered from above to be attached. For fitting the electromagnet block 30, an engaging projection 16*b* and an engaging notch 16*c* are formed on the base 10. Terminal grooves 17 and 18 into which a first coil terminal 50 and a second coil terminal 55 attached to the electromagnet block 30 can be inserted from above, respectively, are provided on the base 10. Furthermore, an operation hole 19 for vertically connecting the lower space 12 and the upper space 13 is formed on the base 10.

As illustrated in FIG. 3, the fixed contact terminal 20 is bended to be substantially L-shaped. A fixed contact 22 of the fixed contact terminal 20 is calked to the tip of a frame-shaped fixed contact fragment 21 which extends in the horizontal direction. For fixing the fixed contact terminal 20 to the base 10, the fixed contact terminal 20 is slidingly moved from the side, and a terminal 23 of the fixed contact terminal 20 is press-fitted to the press-fit groove 14.

The movable contact terminal 25 is bended to be substantially L-shaped. An engaging hole 27 is provided at the tip of a movable contact fragment 26 which extends in the horizontal direction, and a movable contact 28 is calked to the movable contact fragment 26 in the vicinity of the engaging hole 27. When a terminal 29 of the movable contact terminal 25 is press-fitted to the press-fit groove 15 of the base 10 from the side and fixed thereto, the movable contact 28 comes to be opposed to the fixed contact 22 such that the movable contact 28 can releasably contact the fixed contact 22.

While a normally open contact mechanism is formed by the fixed contact terminal 20 and the movable contact terminal 25 in this embodiment, a normally close contact mechanism or a normally open and normally close contact mechanism may be formed.

In the electromagnet block 30, a brim 31 and the brim 32 (FIG. 9) are formed by insert molding of resin on upstanding portions 42 and 43 (FIG. 10E), respectively, positioned at both ends of a barrel 41 of an iron core 40 as illustrated in FIGS. 7 through 10. A coil 33 is wound around the barrel 41 of the exposed iron core 40. An extension line of the coil 33 is bound and soldered to first and second coil terminal 50 and 55 attached to the brim 31.

Figures 10A, 10B, 10C, 10D, 10E:
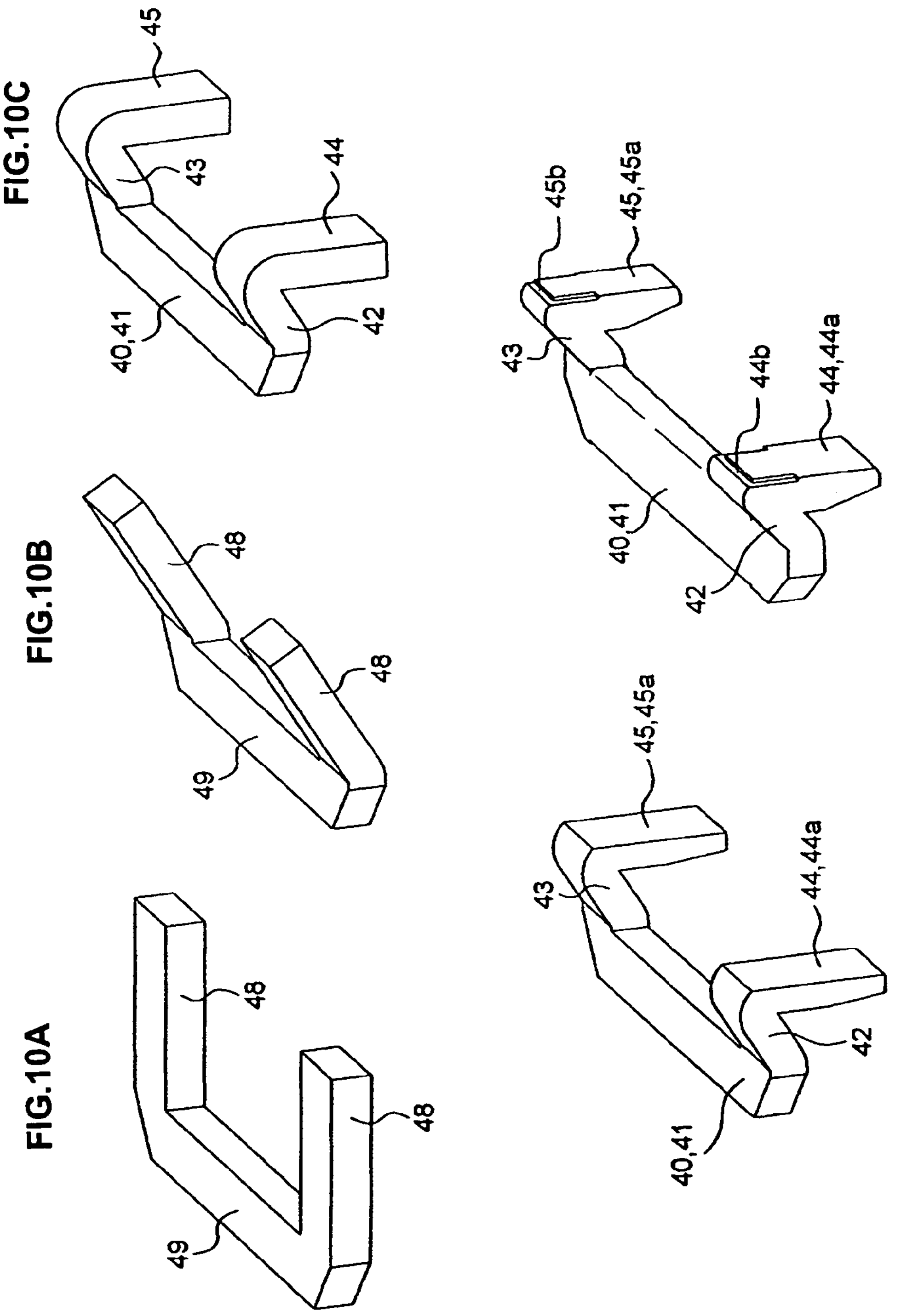
FIGS. 10A through 10E are perspective views showing processes for manufacturing an iron core in the first embodiment.

The iron core 40 is manufactured by the following method as illustrated in FIGS. 10A through 10E. A plate magnetic material is punched by press working to obtain a substantially U-shaped plate magnetic material 49 (FIG. 10A). Both arms 48 which extend from both ends of a linear portion as the barrel 41 in the same direction are each bended at the bases of the arms 48 such that the arms 48 are raised at the same angle (FIG. 10B). Next, magnetic poles 44 and 45 are formed by bending intermediate portions as the upstanding portions 42 and 43 of the arms 48 at an acute angle (FIG. 10C). Then, press working is applied only to the magnetic poles 44 and 45 to form horizontal surfaces thereon and to increase the attractive areas (FIG. 10D). Finally, substantially U-shaped stepped portions 44*b* and 45*b* are formed on the peripheral edges of magnetic-pole surfaces 44*a* and 45*a* by press working so as to prevent adhesion of molding resin to the magnetic-pole surfaces 44*a* and 45*a* of the magnetic poles 44 and 45 (FIG. 10E).

According to the iron core 40 of this embodiment, the barrel 41 has an oblong cross section as illustrated in FIG. 11A. Thus, when a predetermined amount of the coil 33 is wound around the barrel 41 of the iron core 40, the coil 33 does not largely protrude in the lateral direction. Accordingly, the electromagnet block 30 having a decreased width, and thus a thin electromagnetic relay can be manufactured. Moreover, since the magnetic-pole surface 45*a* of the magnet pole 45 shown in FIG. 11B is larger than a substantially L-shaped surface formed by simply bending the arm 48 (FIG. 11C), desired attractive force can be obtained. In particular, the attractive characteristics can be easily controlled in this embodiment since the magnetic-pole areas of the magnetic poles 44 and 45 can be easily altered by appropriately varying the width of the arms 48.

Figure 9:
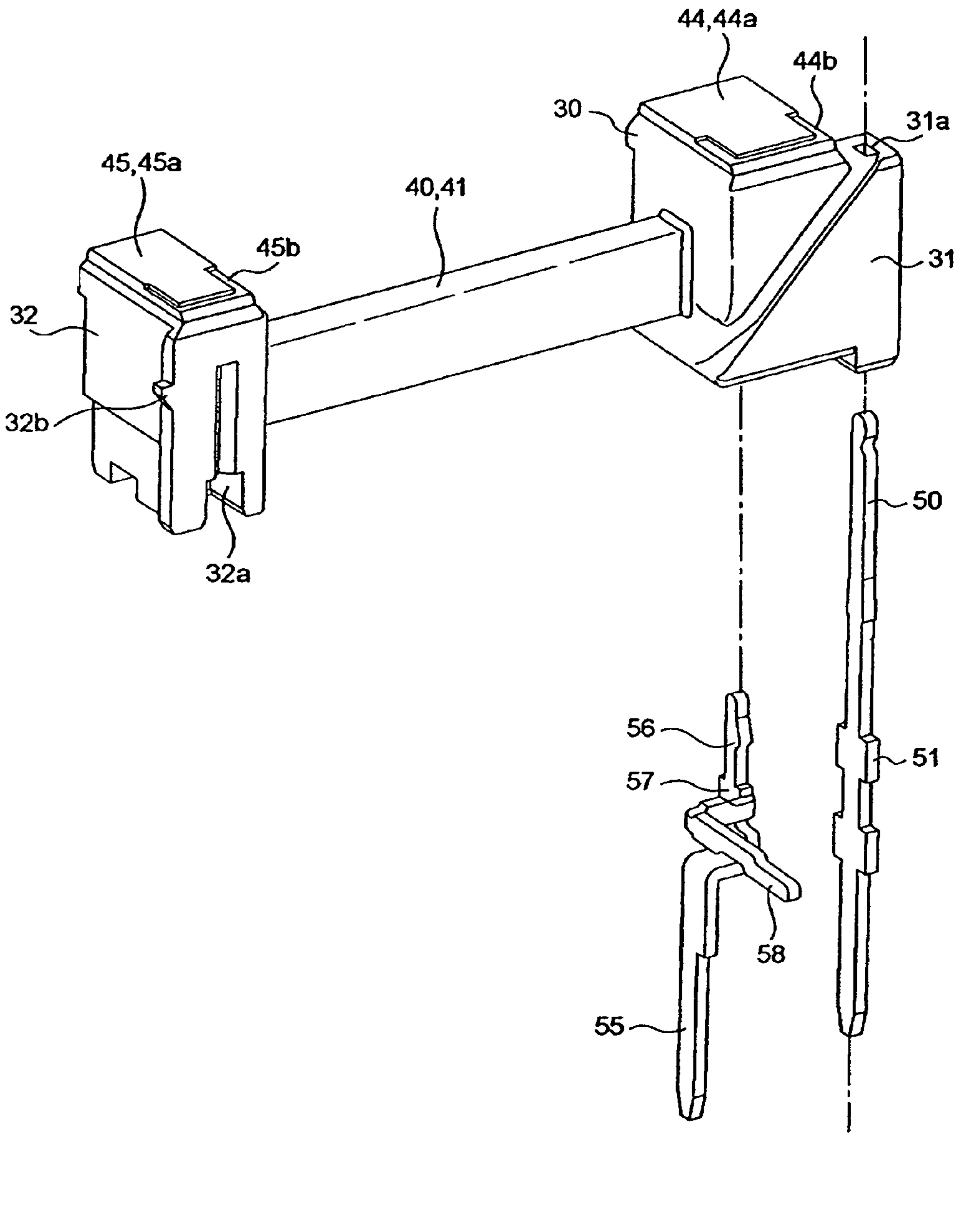
FIG. 9 is a perspective view of the disassembled electromagnet block shown in FIG. 4.

In the first and second coil terminals 50 and 55 attached to the brim 31 of the electromagnet block 30, the first coil terminal 50 is press-fitted to a terminal hole 31*a* vertically penetrating through the brim 31 from below, and is positioned by a positioning rib 51 which contacts the bottom of the brim 31 as illustrated in FIG. 9. As for the second coil terminal 55, an upper end 56 of the second coil terminal 55 is press-fitted to a terminal hole 31*b* of the brim 31 from below (FIG. 8C), and the second coil terminal 55 is positioned by a positioning rib 57 which contacts the bottom of the brim 31. Subsequently, an extension line of the coil 33 wound around the barrel 41 of the iron core 40 is bound to a binding member 58 extending from an intermediate portion of the second coil terminal 55 in the horizontal direction. Then, the binding member 58 is bended toward the iron core 40 to complete the electromagnet block 30.

Figure 5A:
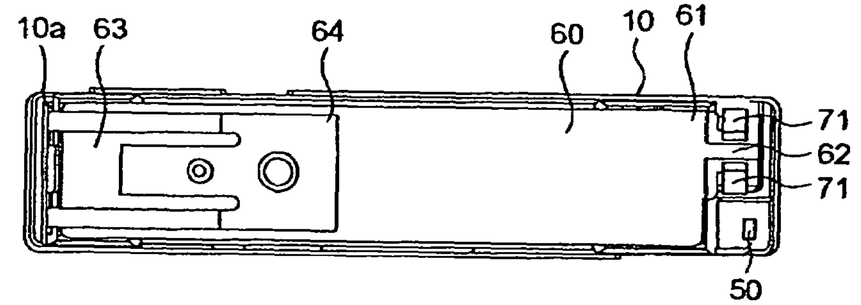
FIGS. 5A and 5B are a plan view and a front view of the main part of the electromagnetic relay shown in FIG. 4, respectively.
Figure 5B:
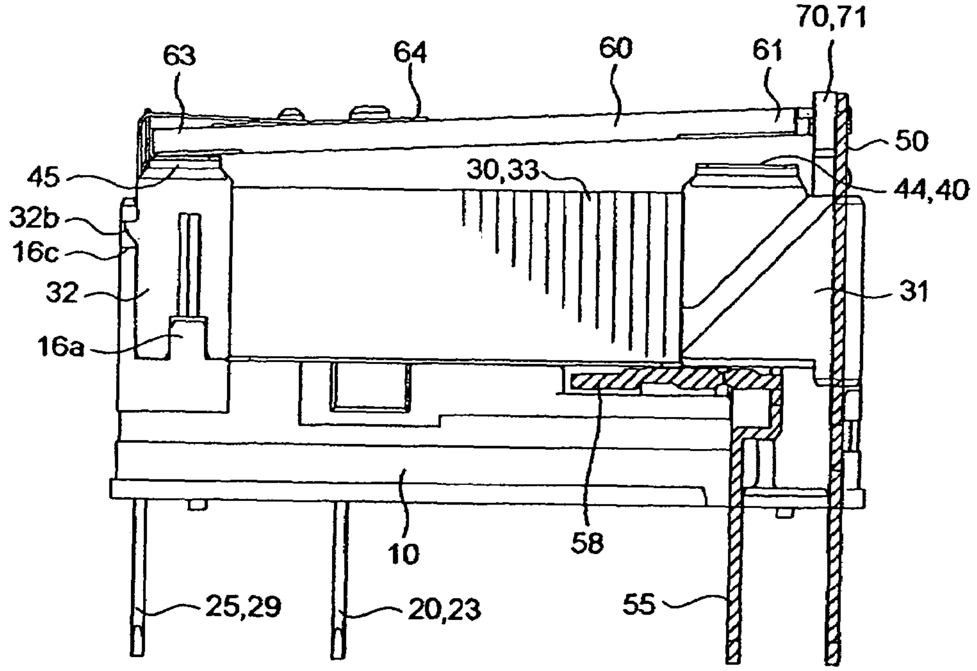

In this embodiment, the first coil terminal 50 is disposed adjacent to an engaging claw 62 of the movable iron fragment 60 to be described later (FIG. 5A), and the second coil terminal 55 is disposed below the brim 31 (FIG. 5B). Thus, the first coil terminal 50 is contained within an external outline of the card 70 in the longitudinal direction as viewed from the side, and the second coil terminal 55 is contained within an external outline of the electromagnet block 30 as viewed from the top. Since surplus space for positioning the first and second coil terminals 50 and 55 in the width direction and the longitudinal direction is unnecessary, a thin, short and miniaturized electromagnetic relay can be manufactured. Additionally, since the binding member 58 of the second coil terminal 55 is finally accommodated within the upper space 13 and positioned below the electromagnet block 30, insulation between the binding member 58 and the contact mechanism can be secured.

Subsequently, as illustrated in FIGS. 3 and 7, the electromagnet block 30 is set within the upper space 13 of the base 10 from above, and the first and second coil terminals 50 and 55 are inserted into the terminal groove 17 and 18 of the base 10, respectively. Then, the notch 32*a* of the brim 32 is fitted to the positioning projection 16*a*, and the engaging notch 31*b* of the brim 31 and an engaging projection 32*b* of the brim 32 are fitted to the engaging projection 16*b* and the notch 16*c* of the base 10, respectively, to complete attachment of the electromagnet block 30. In this condition, an insertion groove 10*a* is formed between the side end face of the brim 32 of the electromagnet block 30 and an external wall of the base 10 (FIG. 5A).

Figure 2:
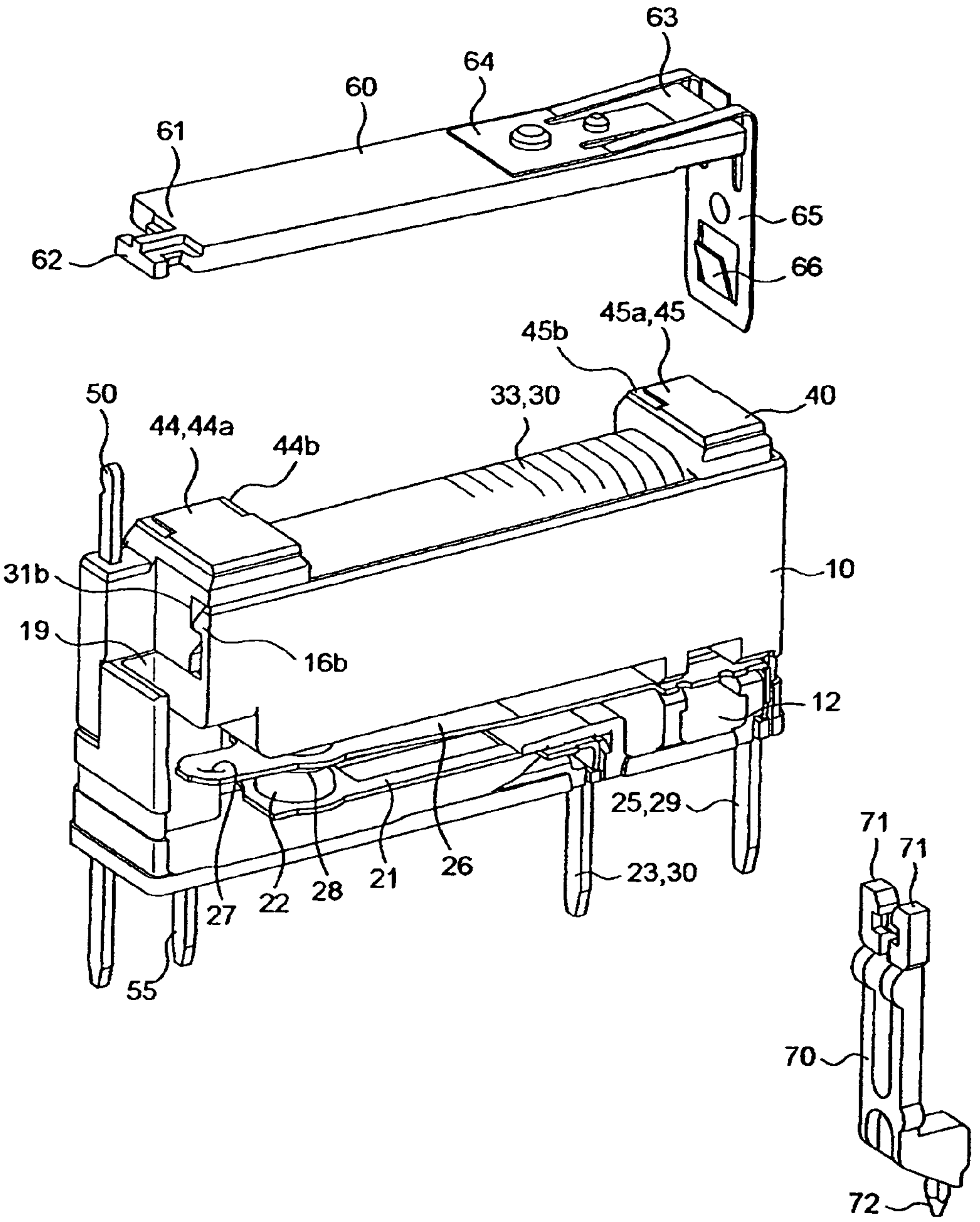
FIG. 2 is a perspective view of a disassembled main part of the electromagnetic relay shown in FIG. 1.

In the movable iron fragment 60, the engaging claw 62 which is substantially T-shaped as viewed from the top is provided at one end 61 of a plate magnetic material which is substantially rectangular as viewed from the top to extend therefrom, and a hinge spring 64 bended to be substantially V-shaped is calked in the vicinity of the other end 63 of the plate magnetic material as illustrated in FIG. 2. An elastic tongue fragment 66 is cut and raised from a vertically extending portion 65 of the hinge spring 64. The engaging claw 62 is disposed offset from the center of the movable iron fragment 60 so as to secure a space for accommodating the first coil terminal 50 (FIG. 5A).

In the condition that the vertically extending portion 65 of the hinge spring 64 is press-fitted to the insertion groove 10*a*, the other end 63 of the movable iron fragment 60 is hinge-supported. Simultaneously, the end 61 comes to be opposed to the magnetic pole 44 of the iron core 40 such that the end 61 can be attracted to the magnetic pole 44 of the iron core 40, and the engaging claw 62 comes to be positioned just above the operation hole 19.

As illustrated in FIG. 2, a pair of elastic arms 71 which elastically engage with the engaging claw 62 of the movable iron fragment 60 are formed at the upper end of the card 70, and an engaging projection 72 engaging with the engaging hole 27 of the movable contact fragment 26 is provided at the lower end of the card 70.

Figure 6:
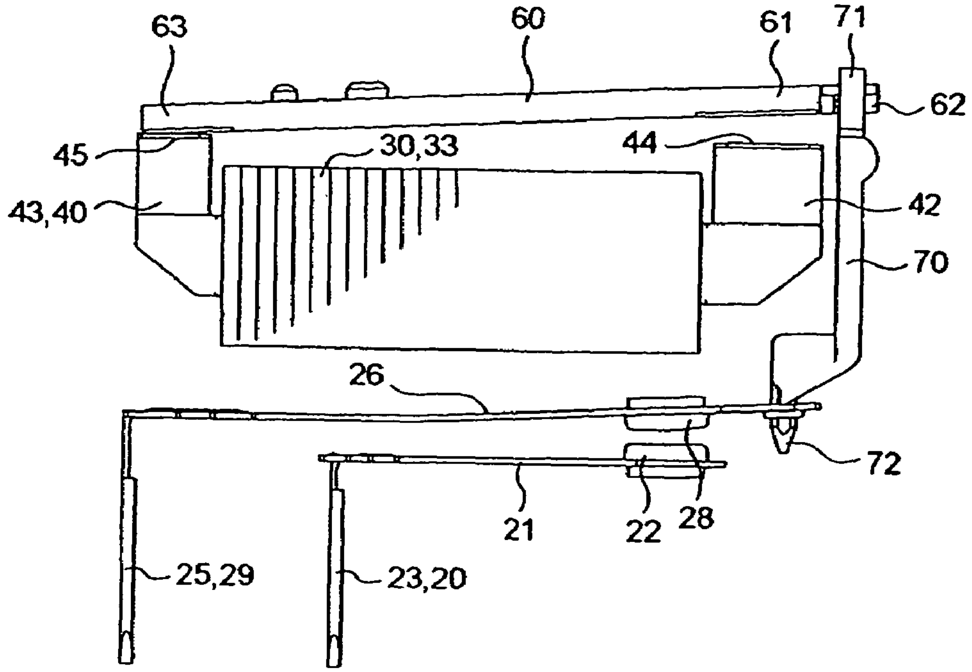
FIG. 6 schematically illustrates the front view shown in FIG. 5B.

Connection between the movable iron fragment 60 and the movable contact fragment 26 is made by fitting the engaging projection 72 to the engaging hole 27 of the movable contact terminal 25 and elastically fitting the pair of the elastic arms 71 to the engaging claw 62 of the movable iron fragment 60 (FIG. 6).

The case 80 is a box-shaped component molded from resin and is capable of engaging with the base 10. In assembly, the internal components such as the electromagnet block 30 are attached to the base 10, and then the case 80 is fitted to the base 10 and sealed thereto to complete assembling of the electromagnetic relay.

Next, the operation of the electromagnetic relay in this embodiment is described.

When voltage is not applied to the coil 33, the movable contact 28 is separated from the fixed contact 22 by the spring force of the movable contact fragment 26. Also, the one end 61 of the movable iron fragment 60 is separated from the magnetic pole 44 of the iron core 40 by upward urging force applied to the card 70.

When voltage is applied to the coil 33, the one end 61 of the movable iron fragment 60 is attracted to the magnet pole 44 of the iron core 40 whereby the movable iron fragment 60 rotates. Since the one end 61 of the movable iron fragment 60 thus rotating lowers the card 70, the card 70 pushes down the tip of the movable contact fragment 26. Then, the movable contact 28 of the movable contact fragment 26 contacts the fixed contact 22 to close the circuit.

When the voltage applied to the coil 33 is stopped, the movable contact fragment 26 pushes up the card 70 by its spring force to rotate the movable iron fragment 60. The movable contact 28 is then separated from the fixed contact 22 to return to the original condition.

Figure 12A:
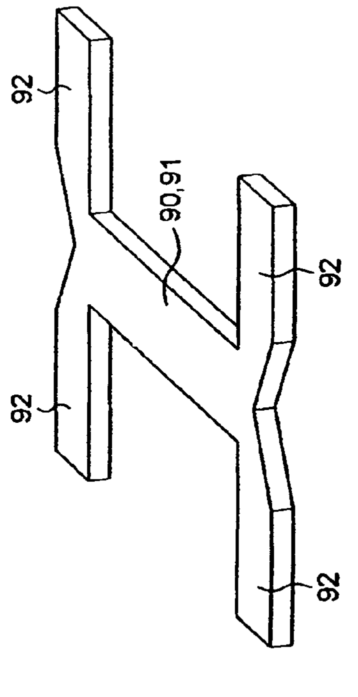
FIGS. 12A through 12E are perspective views showing processes for manufacturing an iron core in accordance with a second embodiment.
Figure 12B:
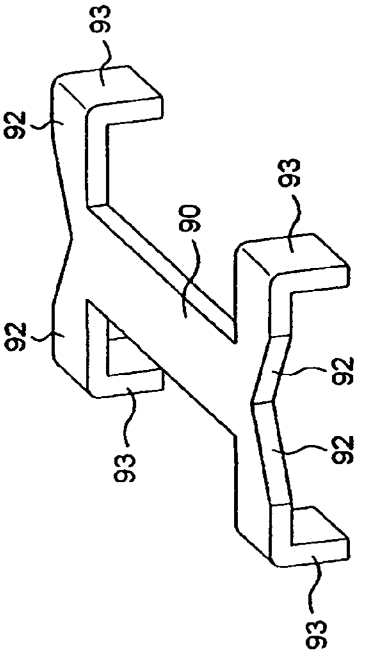
Figure 12C:
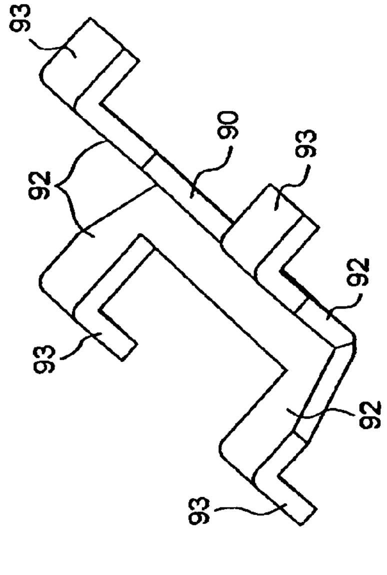
Figure 12D:
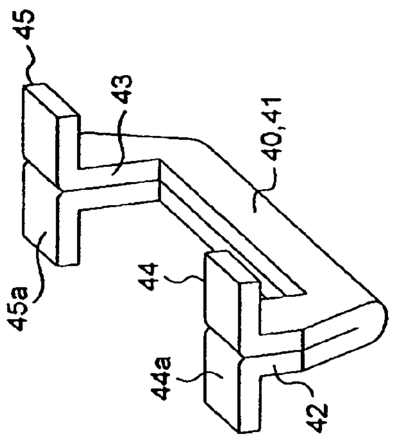
Figure 12E:
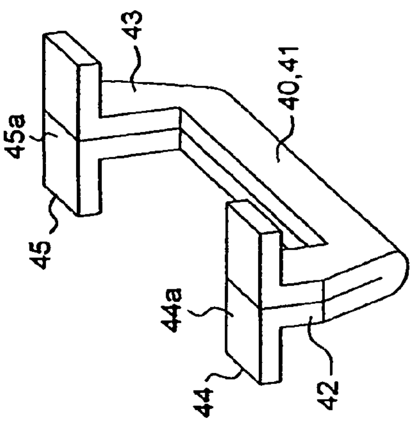

The iron core 40 in a second embodiment is manufactured by the following method shown in FIGS. 12A through 12E. First, an intermediate product 90 which is substantially H-shaped as viewed from the top is punched from a plate magnetic material (FIG. 12A). Subsequently, intermediate portions of arms 92 extending from both ends of a central portion 91 as the barrel 41 in the opposite directions are bended in the same direction (FIG. 12B). Then, the central portion 91 as the barrel 41 is folded into two parts along its center line (FIG. 12C), and the two parts are overlapped with each other into one piece (FIG. 12D). Finally, press working is applied to the magnetic-pole surfaces 44*a* and 45*a* of the magnetic poles 44 and 45 to secure smoothness of the magnetic-pole surfaces 44*a* and 45*a* (FIG. 12E). This embodiment is similar to the first embodiment in other aspects, and thus similar reference numerals are given to similar parts and explanation of those is herein omitted.

According to this embodiment, the plate magnetic material having half the thickness of the plate magnetic material of the first embodiment is used to form the iron core shaft having the same thickness as that of the first embodiment. Thus, the plate magnetic material can be easily processed.

Figure 13A:
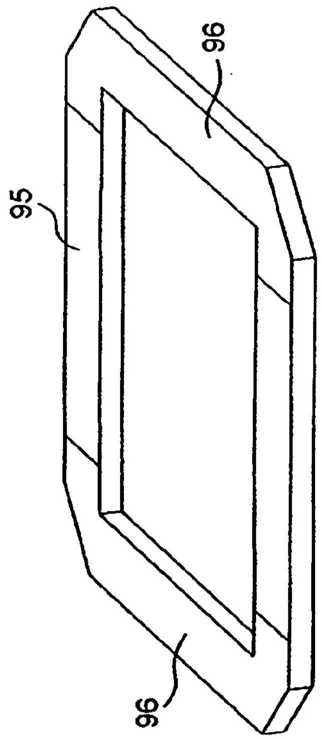
FIGS. 13A through 13D are perspective views showing processes for manufacturing an iron core in accordance with a third embodiment.
Figure 13B:
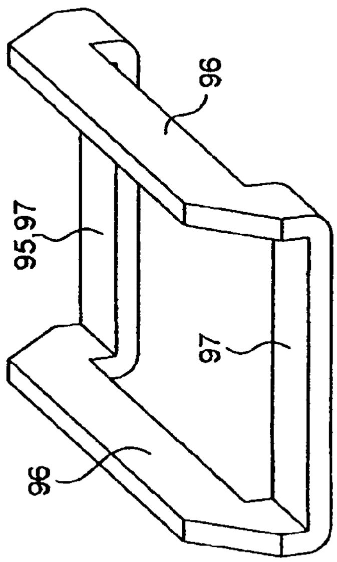
Figure 13C:
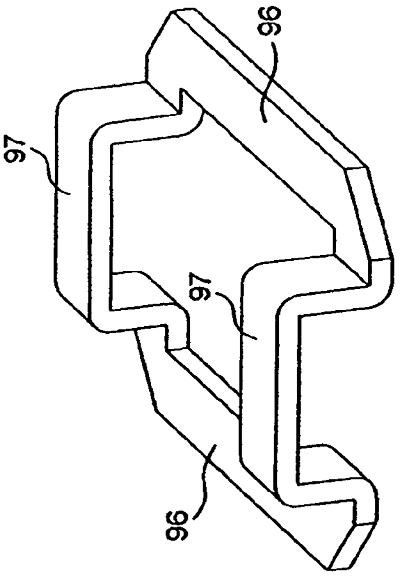
Figure 13D:
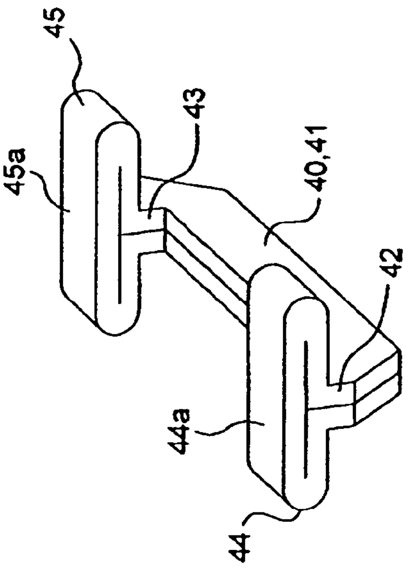
Figure 14A:
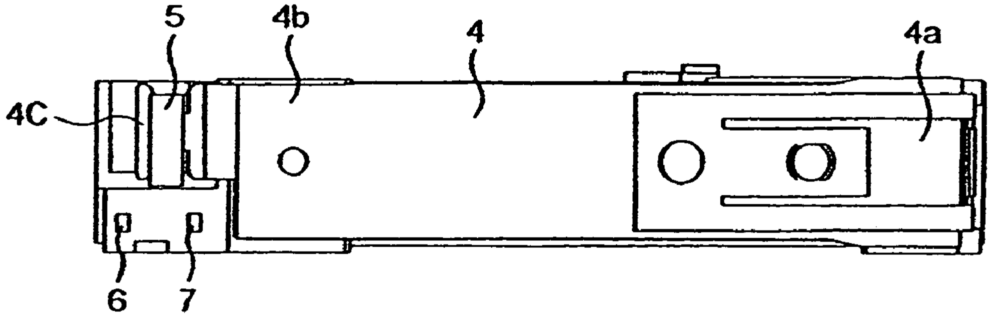
FIG.14A (Prior Art)
FIGS. 14A and 14B are a plan view and a front view of a conventional electromagnetic relay.
Figure 14B:
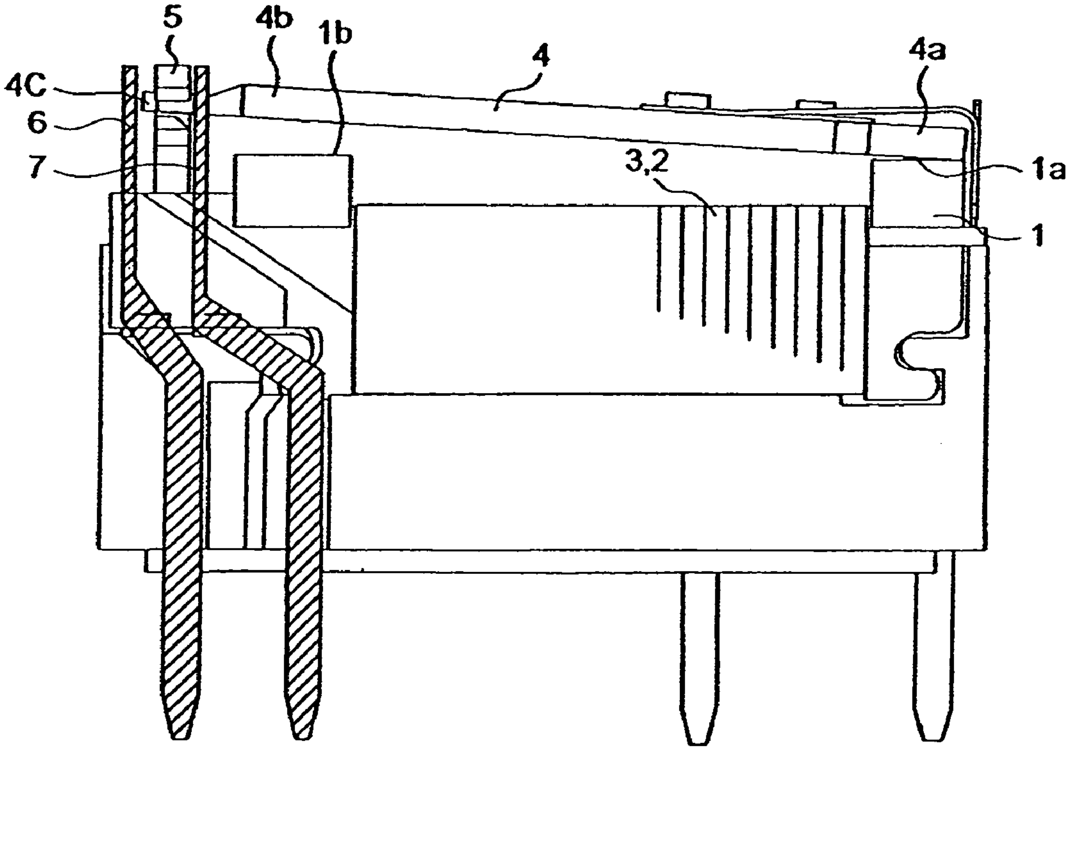
FIG.14B (Prior Art)

The iron core 40 of a third embodiment is manufactured by the following method shown in FIGS. 13A through 13D. A frame-shaped intermediate product 95 is punched from a plate magnetic material by press working (FIG. 13A), and both opposed sides 96 as the barrel 41 are bended to be raised in the same direction (FIG. 13B). Subsequently, intermediate portions 97 as the magnetic poles 44 and 45 are bended to be raised (FIG. 13C), and both the sides 96 are overlapped with each other into one piece (FIG. 13D). This embodiment is similar to the first embodiment in other aspects, and thus similar reference numerals are given to similar parts and explanation of those is herein omitted.

Similarly to the second embodiment, the plate magnetic material of this embodiment which has half the thickness of the plate magnetic material of the first embodiment is used to form the iron core shaft having the same thickness as that of the first embodiment. Thus, the plate magnetic material can be easily processed.

It should be stated that this invention is applicable to other electromagnetic relays as well as those described herein. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic relay, comprising:

an electromagnet block formed by winding a coil around a barrel of an iron core which is substantially U-shaped as viewed from the front; and a movable iron fragment, one end of which is rotatably supported by one of magnetic poles of the iron core, and the other end of which is opposed to the other of the magnetic poles of the iron core such that the other end of the movable iron fragment can be attracted to the other of the magnetic poles, so as to vertically move a card by the other end of the movable iron fragment rotatable in accordance with energization and de-energization of the electromagnet block and thus to open and close a contact, wherein:

a first coil terminal connecting with one of extension lines of the coil is disposed in the vicinity of the other end of the movable iron fragment and the card; and a second coil terminal having a binding member which extends from an intermediate portion of the second coil terminal in a horizontal direction and is allowed to be bended toward the electromagnet block with the other of the extension lines of the coil bound to the binding member is further disposed below the electromagnet block.

* * * * *